United States Patent Office 3,449,220
Patented June 10, 1969

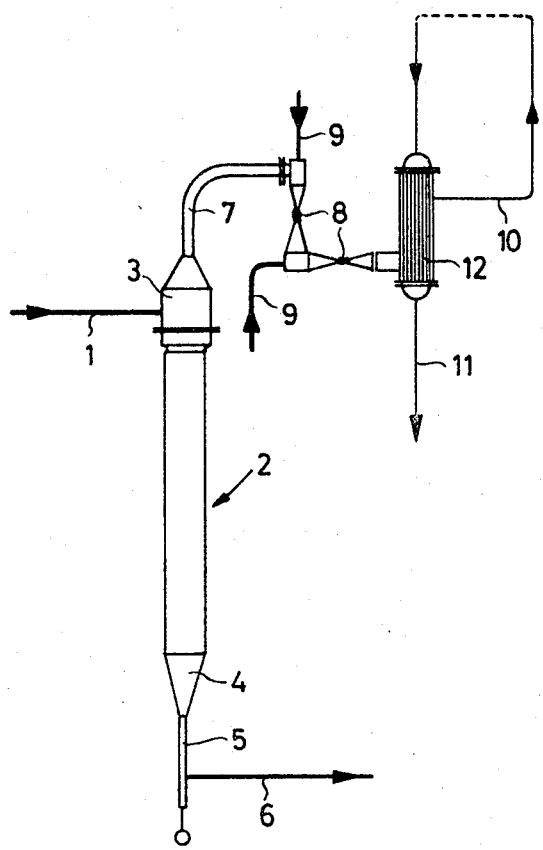

3,449,220
METHOD OF SEPARATING LOW-MOLECULAR WEIGHT COMPONENTS FROM HIGH-POLYMERIC COMPOUNDS BY THIN FILM VACUUM DISTILLATION
Hans-Ferdinand Geisler, Kronberg, Taunus, and Helmut F. Langanke, Offenbach am Main, Germany, assignors to Vickers-Zimmer Aktiengesellschaft, Planung und Bau von Industrienanlagen, Frankfurt am Main, Germany, a corporation of Germany
Filed Dec. 13, 1965, Ser. No. 513,402
Claims priority, application Germany, Dec. 23, 1964, Z 11,247
Int. Cl. B01d 3/28, 3/10
U.S. Cl. 203—89    13 Claims

ABSTRACT OF THE DISCLOSURE

The specification discloses a method of separating a substantial part of the monomeric and oligomeric vaporizable components (low-molecular weight components) from a high-polymer compound, such as "Nylon-6" (a polycaprolactam) or "Dacron" (a polyethylene terephthalate) by vacuum distillation which comprises feeding the high-polymer compound into a vaporizing vessel as a thin film, maintaining the film at a temperature sufficient to vaporize the low-molecular weight components, withdrawing the vaporized components from the vessel by means of a jet ejector maintained at a temperature selected to prevent condensation of the vapors, and subsequently simultaneously condensing the components and propulsion medium, e.g. steam, of said ejector. No carrier gas to sweep the vaporizer is used.

---

The invention relates to a method of separating low-molecular weight components from high-polymer compounds by vacuum distillation.

In the production of synthetic fibres, and in fact generally in the production of high-polymer products, the problem of the more or less complete separation of the low-molecular weight components from the high-polymer compounds, plays an important role. For example polymerized caprolactam, which constitutes the basic product for the production of polyamide fibers ("Nylon-6"), generally still contains about 10 to 12% of low-molecular weight water-soluble components after polymerization, these components consisting chiefly of monomeric caprolactam as well as dimeric and trimeric caprolactam (hereinafter referred to as oligomeric compounds). These low-molecular weight components interfere with further processing of the polymerization product and unfavorably influence the quality of the finished product. Consequently, they have to be separated out before the spinning of the polymerization product.

In the case of polyamide fibers, separation of the low-molecular weight components from the polymerization product is usually brought about by extraction of the solid phase (in the form of chips or granules) with water, at increased temperature. After extraction, the product is dried and finally melted again for spinning. Attempts have already been made to ensure that the fusion or molten mass created during the polymerization of caprolactam, can be freed directly from the low-molecule components, whilst avoiding conversion into the solid phase, thereby making direct spinning of the fusion mass or melt possible. In order to attain this goal it has already been proposed for example, to subject the polymer fusion mass to vacuum distillation or to extract it by blowing in water vapor, or treating it with inert gases in a thin-film vaporizer.

Amongst the proposed methods for directly separating the low-molecular weight components from the polymer fusion mass, vacuum distillation offers the best prospects of success because it needs only relatively short periods of time, and provided that the pressure and temperature conditions are appropriately chosen, it can also, simultaneously, with the monomeric compound, remove the oligomeric compounds, at least to a satisfactory extent. The vacuum apparatus which normally comes into consideration is a single-stage or multi-stage steam jet ejector which is succeeded by a suitable condenser.

Because of the low vapor pressure of the oligomeric compounds, the practical execution of the vacuum distillation requires a vacuum of less than 30 torr (mm. of mercury) and a high vaporizing temperature (whose upper limit reaches 270° C. to 280° C., on account of the re-forming rate of the low-molecular weight components, which is increased with rising temperature). An appreciable difficulty is caused however by the fact that the oligomeric compounds begins to melt above the melting point of the high-polymer product (which lies at about 220° C.) and therefore do not exist in the fluid condition at the distillation temperature, but are dissolved in the melt, solely as the consequence of their low concentration. The result is that the oligomeric compounds are actually subject to sublimation through the vacuum distillation and precipitate in solid form during condensation, whereas the monomeric compound, whose vapor pressure is already relatively high in the region of the distillation temperature, is condensed in liquid form. Thus it is not possible to condense the monomeric compound and the oligomeric compounds jointly in fluid form, so that continuous operations require the use of alternating condensers or scraper condensers while charge operations necessitate the use of large solids condensers which have to be thawed out after each charge. This is fairly extravagant in terms of apparatus and is certainly quite unfavorable from the energy aspect. Moreover, there is the continual great risk of a stoppage in the extraction installation.

It is not possible to avoid these difficulties of a simultaneous separation of the monomeric compound and the oligomeric compounds by a two-stage distillation in which first the monomeric compound and then the oligomeric compounds are separated, because, with the reduction in the proportion of monomeric compound in the polymer melt, there occurs a diminution of the vapor pressure of the monomeric compound which makes a sufficient separation of the monomeric compound without simultaneous separation of the oligomeric compounds, practically impossible. Moreover, on account of the fact that the monomer portion and the polymer portion in the melt are in reversible chemical equilibrium, a re-forming of the monomeric compound from the polymer portion is initiated in the polymerized caprolactam after separation of the polymer portion, so that an additional monomeric compound would be present again in a second distillation stage.

Problems similar to those which have been discussed above in the example of the production of polyamide fibers, also occur with other high-polymer compounds. For example in the production of polyester fibers by polycondensation of the re-esterification product diglycol-terephthalate, there is a liberation of ethylene glycol, which has to be drawn off continuounly. At the same time however, the almost insoluble high-melting point diglycol-terephthalate is entrained in small quantities.

According to the invention, the above described difficulties arising in the separation of vaporizable low-molecular weight (monomeric and oligomeric) components of high-polymer compounds by distillation, are overcome by arranging that the low-molecular weight component vapors are extracted from the high-polymer compound by means of a steam jet ejector which is kept at a temperature level sufficiently high to prevent condensation of these vapors, whereupon they are precipitated in a condenser together with the propulsion medium (steam) from the steam jet ejector. The requisite temperature level of the steam jet ejector can be ensured by raising the temperature of the latter (for example, to between about 200° to 280° C.) by suitable heating devices (e.g. induction heating or a steam-charged heating jacket) and/or by feeding with superheated propulsion steam (for example, about 350° C.) which, notwithstanding the cooling which takes place during expansion, is still so hot that all parts of the steam jet ejector are adequately heated. In any case, this ensures that the oligomeric compounds traverse the steam jet ejector without condensation.

The execution of the method according to the invention is not limited to certain specific apparatus, provided that the requisite process conditions are ensured. Thus, for example the steam jet ejector may be of the single-stage or multistage type, in which the propulsion nozzle, diffuser and casing are at the necessary increased temperature, while the condenser may for example be of the surface type or of the mixing type.

In an appropriate embodiment of the invention, the propulsion steam may be so chosen with regard to its nature and quantity, that the low-molecular weight components pass completely into solution in the condensed propulsion steam, after joint condensenation. For example, by choosing the number of steam jet stages within certain limits, the volume of propulsion steam may be so regulated with respect to the quantity of extracted low-molecular weight components that, even at the normal cooling water temperature of say 20° C., the oligomeric compounds may be precipitated in a form which enables any simple condenser to be used. If the volume of propulsion steam—though being sufficient for creating the essential vacuum—is not adequate for dissolving the extracted low-molecule weight components, an additional supply of water or other suitable liquid may be fed into the condenser, in order to keep the low-molecular weight components in solution.

Further details of the invention will be explained below in connection with examples, with the aid of the drawing.

The drawing is a schematic representation of a vacuum distillation installation, followed by a condenser.

EXAMPLE I

In the usual manner, caprolactam is polymerized in a suitable reactor, preferably a continuously acting one, for example in a "VK" tube. The polymerization product, which contains about 7.7% monomeric caprolactam and about 3% of oligomeric caprolactam, is passed via a line 1 to the head 3 of a vaporizing vessel 2. This vaporizing vessel 2 is preferably constructed as a thin-film vaporiser. At the head 3, the polymerization product is distributed over the surface of the vaporization vessel 2 in a thin layer. It runs down the inner walls of the vaporizing vessel 2 and collects at the bottom 4, where it is drawn off, for example by a motor-driven extracting worm 5, and is immediately passed on for further processing, e.g. the spinning stage, via a line 6. Advantageously, the evaporating vessel 2, the supply line 1 and the extraction line 6 are suitably heated, for example by a steam-charged heating jacket.

A two-stage steam jet ejector 8 is joined to the head 3 of the vaporizing vessel 2 through a line 7 and is charged with steam at a pressure of 6 atu. (6 atmospheres pressure above normal, equivalent to 7 atmospheres absolute) acting as a propelling medium, through feed lines 9. A condenser 12 (for example a surface condenser) is inserted behind the steam jet ejector 8 and has its temperature lowered by cooling water at about 20° C. passing through a pipe circuit 10. The condensate is drawn off from the condenser 12 through a line 11.

A pressure of about 2 torr (mm. mercury) is created in the vaporizing vessel 2 by the two steam jet ejectors. At the same time a temperature of about 260° C. is maintained in the vaporizing vessel through the heating jacket. The result is that the monomeric compound and the oligomeric compounds vaporize to such an extent from the polymer melt supplied through the line 1, that the fusion mass or melt in the extraction line 6, still has a content of 0.5% of monomeric compound and about 1.5% of oligomeric compounds. Naturally, care must be taken to ensure that the further processing of the fusion mass or melt in the line 6 takes place with sufficient rapidity, so that fresh low-molecule compounds will not develop due to the restoration of the chemical equilibrium.

The evaporated low-molecular weight components are compressed to about 25 torr by the steam jet ejector 8. Both stages of the steam jet ejector 8, and preferably the connecting line 7 also are kept to a temperature of about 280° C. by a heating means, for example a steam-charged heating jacket (also not shown in detail in the drawing), so that condensation of the oligomeric compounds cannot take place in the line 7 or in the steam jet ejector 8.

The drawn-off vapors are condensed together with the propulsion steam in the condenser 12, the vacuum necessary for the latter being maintained for example by means of a water-ring pump. The quantity of propulsion steam is so adjusted that approximately 15 weight units of propulsion steam are consumed per weight unit of extracted low-molecular weight component vapors. This results in an approximately 6.7% aqueous solution of the low-molecular weight components. At this concentration, the oligomeric compounds are also fully dissolved, so that the solution can be drawn off without difficulty via line 11, for example by a barometric mounting of the two steam jet stages and the condenser 12. The extracted condensate solution is appropriately concentrated by evaporation and is then worked up again to caprolactam by distillation.

EXAMPLE II

Dimethyl-terephthalate is re-esterified to diglycolterephthalate with ethylene glycol in the presence of a catalyst in the usual manner, with continuous separation of the methyl alcohol thereby forming. This re-esterification product is then condensed to a polyester by means of a further catalyst. Ethylene glycol splits off and this must be continuously separated in order that the chain formation does not break off.

To ensure adequate separation of the ethylene glycol requires a vacuum which, in the final phase must amount to 0.4 torr (mm. mercury). At this vacuum, however, in addition to the ethylene glycol, a small quantity of the re-esterification product diglycol-terephthalate which has a relatively high vapor pressure, is simultaneously drawn off. However, the melting point of diglycol-terephthalate is so high and its solubility in ethylene glycol is so low, that it is precipitated in solid form during the condensation of the ethylene glycol. Moreover, it tends to condense already at the walls of the steam jet ejector, with the result that the latter becomes clogged.

In order to overcome these difficulties, the propulsion steam of the steam jet ejector is superheated to a temperature of 450° C. prior to entry into the jet nozzle. The result is that condensation of the diglycol-terephthalate in the steam jet ejector is avoided so that clogging no longer takes place, even in continuous operation. As already explained previously in connection with Example I, the extracted vapors along with the propulsion steam, are deposited in a condenser interposed behind the steam jet ejector.

We claim:
1. A method of separating low-molecular weight components from high polymer compounds containing such components, said high polymer compounds being selected from the group consisting of polymerized caprolactam and polycondensed diglycolterephthalate, and said low-molecular weight components being selected from the group consisting of ethylene glycol and monomeric and oligomeric caprolactam, comprising:
(a) vacuum distilling vapors of said components from a thin film melt of said high polymer compound in a first zone,
(b) contacting said vapors with a jet of steam in a second zone, said jet of steam providing vacuum in said first zone,
(c) maintaining said second zone at a temperature sufficient to prevent condensation of said components, and
(d) thereafter condensing simultaneously in a third zone said steam and said components.

2. A method of separating low-molecular weight components from high polymer compounds containing such components, said high polymer compounds being selected from the group consisting of polymerized caprolactam and polycondensed diglycolterephthalate, and said low-molecular weight components being selected from the group consisting of ethylene glycol, and monomeric and oligomeric caprolactam, comprising:
(a) forming a thin-film melt of said high polymer compound in a first zone,
(b) subjecting said thin film melt to a reduced pressure in the absence of a carrier gas whereby low-molecular weight components are vaporized therefrom,
(c) passing said vapors into contact with a jet of steam in a second zone, said jet of steam providing said reduced pressure,
(d) maintaining said second zone at a temperature sufficient to prevent condensation of said components, and
(e) thereafter condensing said steam and said components simultaneously in a third zone whereby a water solution containing said low-molecular components is formed.

3. A method of separating low-molecular weight components from high polymer compounds containing such components, said high polymer compounds being selected from the group consisting of polymerized caprolactam and polycondensed diglycolterephthalate, and said low-molecular weight components being selected from the group consisting of ethylene glycol and monomeric and oligomeric caprolactam, comprising:
(a) maintaining in a first zone a melt of said high polymer compound in a thin film condition at an elevated temperature and reduced pressure whereby vaporization of said low-molecular weight components is promoted from said film,
(b) passing steam in jet conformation into a second zone, whereby reduced pressure is produced in said first zone and vapors from said first zone are withdrawn to said second zone in the absence of a carrier gas,
(c) maintaining said second zone at a temperature sufficient to prevent condensation of said components, and
(d) thereafter condensing simultaneously in a third zone said steam and said components.

4. A method as in claim 3 wherein said reduced pressure is less than 30 mm. Hg.

5. A method as in claim 3 wherein said reduced pressure in said first zone is about 2 mm. Hg.

6. A method as in claim 3 wherein said second zone is maintained at a temperature of between 200–280° C.

7. A method as in claim 3 wherein said condensation occurs at a pressure greater than 5 mm. Hg.

8. A method as in claim 3 wherein said vaporized components are compressed in said second zone to a pressure of about 25 mm. Hg.

9. A method as in claim 3 wherein said steam is superheated to a temperature of at least 350° C.

10. A method as in claim 3 which includes the additional step of: (a) supplying said steam in superheated condition and in sufficient amount whereby a water solution containing said low-molecular weight components is formed during said condensation step.

11. A method as in claim 3 wherein said steam is passed into said second zone in an amount of about 15 parts by weight per part by weight of component vapors, whereby a water solution of said components is formed during said condensation step.

12. A method as in claim 3 wherein said steam is passed into said second zone at a pressure of about 7 atmospheres absolute.

13. A method of claim 1 wherein said high polymer compound is polymerized caprolactam, and said low-molecular weight components are selected from the group consisting of monomeric and oligomeric caprolactam, and mixtures thereof.

References Cited
UNITED STATES PATENTS

| | | | |
|---|---|---|---|
| 2,489,703 | 11/1949 | Cook et al. | 203—91 |
| 2,682,499 | 6/1954 | Thurman | 202—205 |
| 2,793,235 | 5/1957 | Jenkinson. | |
| 2,862,021 | 11/1958 | Bille | 203—91 |
| 2,952,675 | 9/1960 | Bolle | 260—239.3 |
| 3,017,289 | 1/1962 | Miller et al. | 202—236 |
| 3,252,502 | 5/1966 | Eckardt et al. | 260—239.3 |
| 3,258,410 | 7/1966 | Temple et al. | |

WILBUR L. BASCOMB, JR., *Primary Examiner.*

U.S. Cl. X.R.

159—49; 202—205; 203—91, 92; 260—75, 78, 239.3, 637